Nov. 3, 1925.
H. A. DOUGLAS
1,559,685
DRILLING MACHINE
Filed Nov. 1, 1923    2 Sheets-Sheet 1
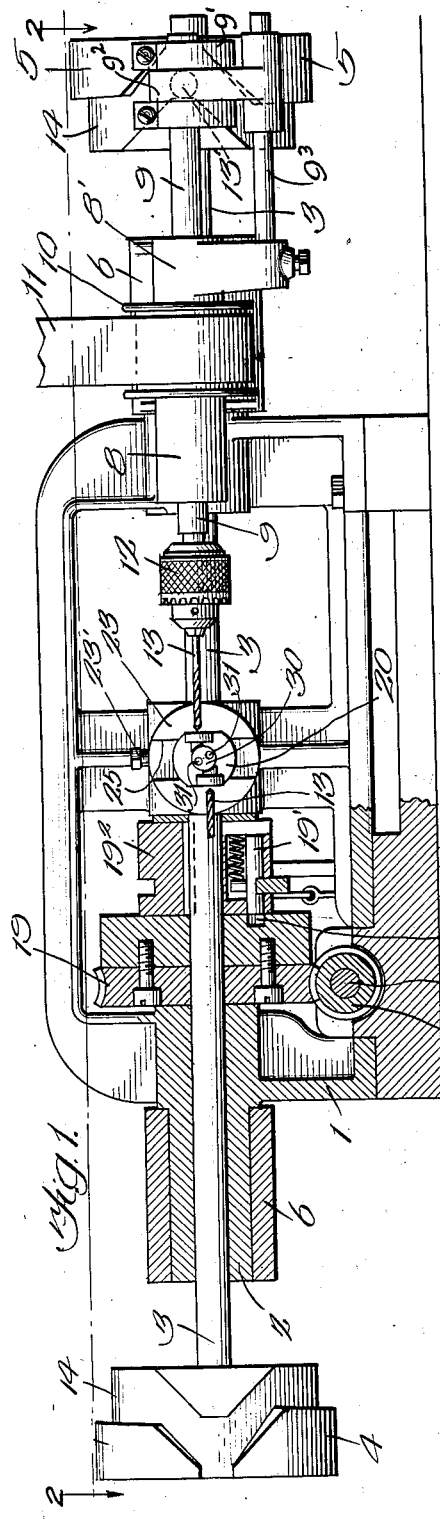
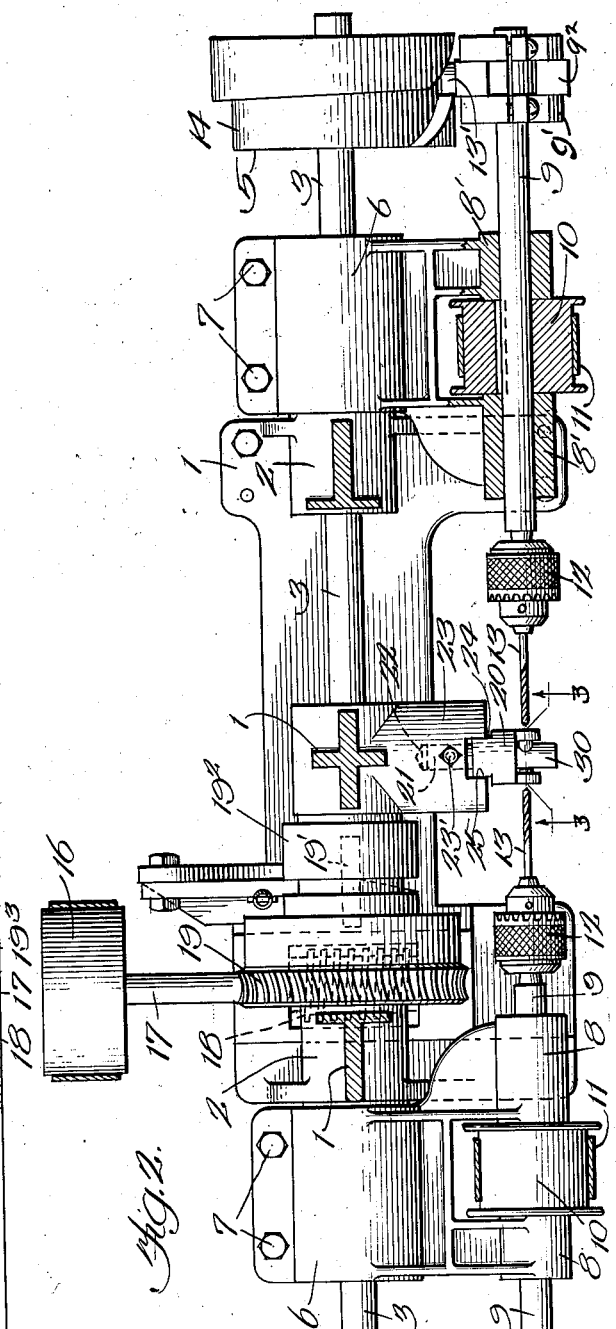
Inventor:
Harry A. Douglas
By G. L. Bragg Atty.

Nov. 3, 1925.  1,559,685
H. A. DOUGLAS
DRILLING MACHINE
Filed Nov. 1, 1923   2 Sheets-Sheet 2
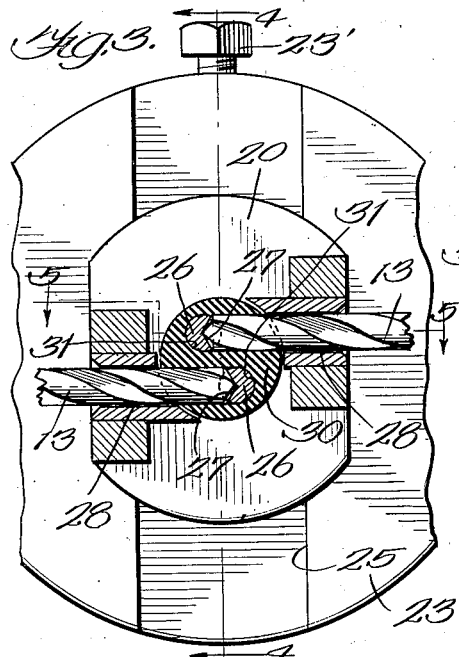
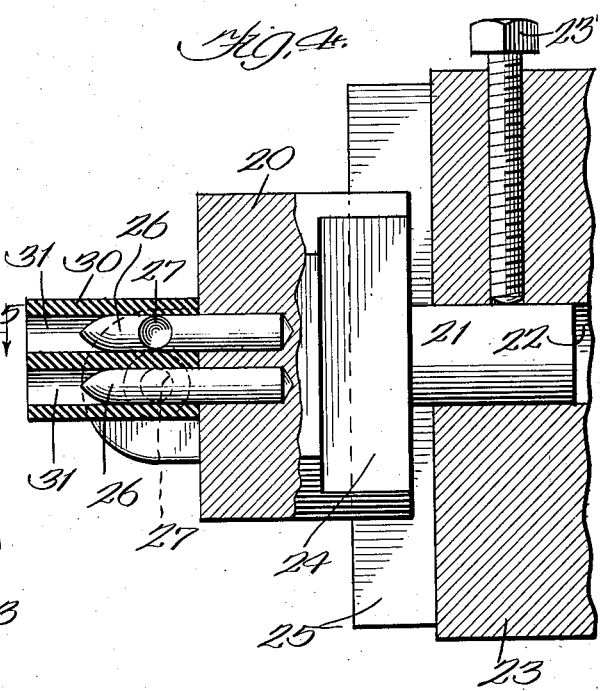
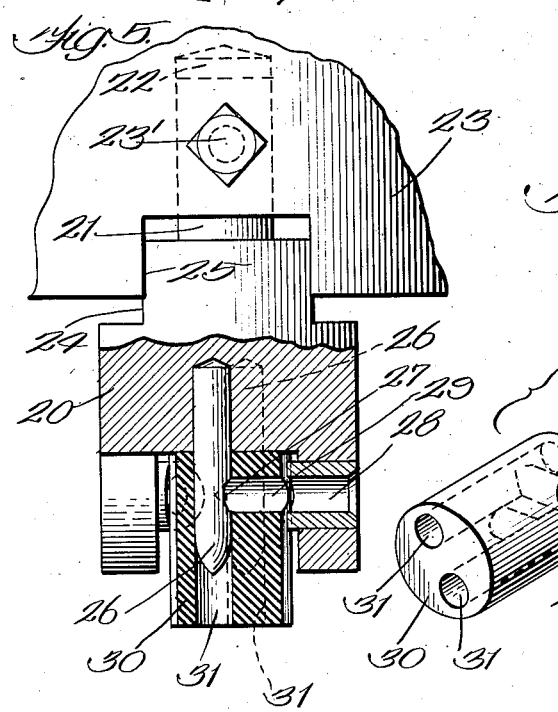
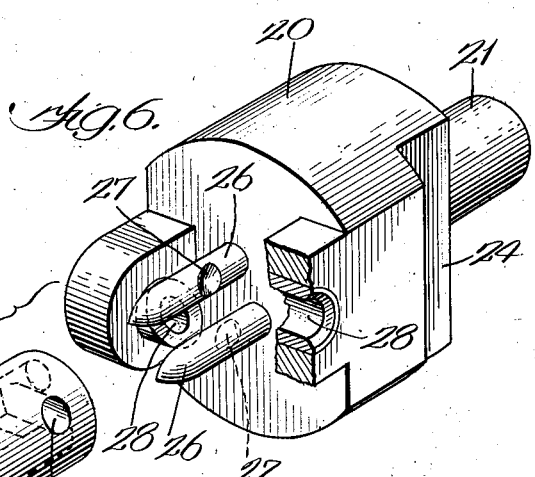
Inventor:
Harry A. Douglas Patented Nov. 3, 1925.

1,559,685

UNITED STATES PATENT OFFICE.

HARRY A. DOUGLAS, OF BRONSON, MICHIGAN.

DRILLING MACHINE.

Application filed November 1, 1923. Serial No. 672,114.

*To all whom it may concern:*

Be it known that I, HARRY A. DOUGLAS, citizen of the United States, residing at Bronson, in the county of Branch and State of Michigan, have invented a certain new and useful Improvement in Drilling Machines, of which the following is a full, clear, concise, and exact description.

My invention relates to drilling machines for forming holes in objects and transverse to and communicating with other holes present in the objects in a manner to remove or prevent burs or other imperfections at the junctures of the holes.

The machine of my invention is of particular utility in forming holes in bodies of insulation for receiving binding screws that enter circuit terminals disposed in other holes.

The machine of my invention includes a work holding pin formed with a recess on one side thereof, a support for the pin, and a drill holder serving to position the drill in alignment with the recess, said drill holder and pin being relatively movable to bring the drill into and out of said recess whereby the place of juncture of the hole formed by the drill and the hole in the work that receives the work holding pin may be smooth and free of imperfections that otherwise might be due to the drilling operation.

In one embodiment of the invention, two substantially parallel work holding pins are employed, each formed with a recess on a side thereof opposite the recessed side of the other, said recesses being adapted to receive the ends of drills that are passed into and out of the work upon the pins. These drills are carried upon drill holders, one individual to each pin, and serving to position the drills held thereby in alignment with the corresponding recess. The support for the pins desirably also carries drill guides, each pin having a drill guide individual thereto. Suitable mechanism is employed for causing the drill holders to mutually approach each other in a drilling operation.

I will explain my invention more fully by reference to the accompanying drawings in which Fig. 1 is a longitudinal view, partially in section and partially in elevation, illustrating the preferred embodiment of the invention; Fig. 2 is a sectional view on lines 2—2 of Fig. 1; Fig. 3 is a sectional view on line 3—3 of Fig. 2; Fig. 4 is a sectional view on line 4—4 of Fig. 3; Fig. 5 is a sectional view on line 5—5 of Fig. 3; and Fig. 6 illustrates the work holder and work in separated relation.

Like parts are indicated by similar characters of reference throughout the different figures.

The machine includes a frame 1 provided with bearings 2 which carry the cam shaft 3, this shaft having cams 4 and 5 upon the ends thereof. Brackets 6 are carried by the bearings 2, these bearings being preferably cylindrical upon the exterior to receive the brackets that are correspondingly shaped, each bracket being formed in two parts which are clamped upon the corresponding bearing by means of suitable clamping bolts 7. The brackets carry aligned bearings 8 and aligned bearings 8' respectively, in which the drill driving shafts 9 are journaled, each shaft having a pulley 10 splined thereon, these pulleys being driven by belts 11, in the embodiment of the invention illustrated. The bearings 8, 8' may be swung to adjust the alignment of the shafts, the bolts 7 being coaxial for the purpose. Each shaft 9 carries a drill holder 12, the drills 13 carried by these holders facing each other. In the embodiment of the invention shown, the drills are offset and parallel, with bearings 8 and the bearings 8' being correspondingly offset. The drill shafts carry grooved collars 9' which receive forks 9² that carry the cam rollers 13'. These cam rollers enter cam ways 14 upon the cam wheels 4, 5. The forks are reciprocated by the cams upon normally stationary rods 9³ which are carried by the bearings 8, 8' for the drill shafts. The reciprocating forks cause the cam rollers therein to advance and withdraw the drill shafts. The shaft 3 carrying the cam wheels is driven by a belt operated pulley 16 whose shaft 17 carries the worm 18 that is in mesh with the worm gear 19 coaxial with the shaft 3. Any suitable tripping mechanism is employed for coupling the worm gear 19 with the shaft 3 each time the shaft is to be turned for the purpose of operating the cams 4, 5. The tripping mechanism illustrated includes a pedal operated pin 19' carried by the collar 19² that is fixed upon shaft 3, movable into and out of the recess 19³ to couple or separate the gear 19 and shaft 3. As such tripping mechanism is well understood, it will not be further described. The cam wheels 4, 5 are of symmetrical construction and serve to move the drill shafts 9 in and out so that the drills are caused to approach the work simultaneously and to recede simultaneously. The work holder 20 has a stem 21 receivable in a socket 22 formed in the frame extension 23. This socket is placed with its axis midway between the ends of the drills, set bolt 23' serving to secure the holder within the socket. The holder is formed with flat sides 24 that are in sliding engagement with the sides 25 of an upright groove formed in the frame extension 23 whereby the holder is prevented from turning upon the axis of its stem. The holder carries two substantially parallel work holding pins 26, each formed with a conical recess 27 on a side thereof opposite the recessed side of the other pin. These recesses 27 are adapted to receive the inner ends of the drills 13 at the conclusion of the working strokes of these drills. The support or holder 20 for the pins also carries drill guides 28 having cylindrical holes therethrough which are respectively aligned with the recesses 27 whereby the drills are accurately guided while drilling.

The drilling machine of my invention is particularly adapted to form holes 29 in the cylindrical insulating body 30 that is to carry electrical contacts, these holes 29 being upon chords of the cylindrical insulating body and having their axes intersecting the axes of the longitudinal holes 31 that are formed to hold wire receiving circuit terminals, the purpose of the holes 29 being to receive binding screws that pass through the circuit terminals into connection with the wires received therein.

Having thus described my invention I claim as new and desire to secure by Letters Patent the following:—

A work holder including two substantially parallel work holding pins each formed with a recess on a side thereof opposite the recessed side of the other; a support for said pins; and tool guides, each recess having a guide aligned therewith.

In witness whereof, I hereunto subscribe my name this 24th day of October A. D., 1923.

HARRY A. DOUGLAS.